(12) United States Patent
Mazzara et al.

(10) Patent No.: US 7,006,819 B2
(45) Date of Patent: Feb. 28, 2006

(54) METHOD OF PROGRAMMING A TELEMATICS UNIT USING VOICE RECOGNITION

(75) Inventors: William E. Mazzara, Drayton Plains, MI (US); Michael A. Hichme, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 622 days.

(21) Appl. No.: 10/141,430

(22) Filed: May 8, 2002

(65) Prior Publication Data

US 2004/0203691 A1 Oct. 14, 2004

(51) Int. Cl.
H04Q 7/20 (2006.01)

(52) U.S. Cl. .................. 455/418; 455/563; 455/569.2; 701/36

(58) Field of Classification Search ........ 455/418–420, 455/422.1, 411, 415, 569.2, 424–425; 340/426.14, 340/426.2; 704/208, 231, 270; 701/36, 701/1; 379/88.04, 88.07, 88.16
See application file for complete search history.

(56) References Cited

U.S. PATENT DOCUMENTS

| | | | | |
|---|---|---|---|---|
| 5,450,525 A | * | 9/1995 | Russell et al. ............... | 704/275 |
| 5,956,636 A | * | 9/1999 | Lipsit .......................... | 455/411 |
| 6,349,222 B1 | * | 2/2002 | Hafiz ....................... | 455/569.2 |
| 6,490,455 B1 | * | 12/2002 | Park et al. ................ | 455/456.4 |
| 6,580,916 B1 | * | 6/2003 | Weisshaar et al. ........ | 455/456.1 |
| 6,633,090 B1 | * | 10/2003 | Harter et al. .............. | 307/10.6 |
| 6,693,517 B1 | * | 2/2004 | McCarthy et al. ...... | 340/426.16 |
| 6,728,612 B1 | * | 4/2004 | Carver et al. .................. | 701/33 |
| 6,853,910 B1 | * | 2/2005 | Oesterling et al. ........ | 455/456.2 |
| 6,892,065 B1 | * | 5/2005 | Reeser ........................ | 455/413 |
| 6,915,126 B1 | * | 7/2005 | Mazzara, Jr. ............... | 455/411 |
| 2002/0140545 A1 | * | 10/2002 | Nietupski et al. .......... | 340/5.72 |
| 2003/0103482 A1 | * | 6/2003 | Van Bosch ................. | 370/338 |
| 2003/0139173 A1 | * | 7/2003 | Mazzara et al. ............ | 455/418 |
| 2003/0143976 A1 | * | 7/2003 | Wang ......................... | 455/411 |
| 2003/0143987 A1 | * | 7/2003 | Davis et al. ................. | 455/459 |
| 2003/0182360 A1 | * | 9/2003 | Mocek et al. ............... | 709/203 |
| 2003/0191646 A1 | * | 10/2003 | D'Avello et al. ........... | 704/270 |
| 2004/0193343 A1 | * | 9/2004 | Tan et al. ...................... | 701/36 |
| 2004/0203340 A1 | * | 10/2004 | Oesterling ..................... | 455/9 |
| 2004/0203634 A1 | * | 10/2004 | Wang et al. .............. | 455/414.1 |
| 2004/0203730 A1 | * | 10/2004 | Fraser et al. ............. | 455/426.1 |

* cited by examiner

*Primary Examiner*—Joseph Feild
*Assistant Examiner*—Kamran Afshar
(74) *Attorney, Agent, or Firm*—Anthony Luke Simon

(57) ABSTRACT

The invention provides a method for programming a telematics unit in a mobile vehicle. A command signal may be received in response to a predetermined voice-recognition command. A cellular programming mode may be activated based on the command signal. A predetermined mobile phone identification number may be received in response to at least one voice-recognition entry. An operations mode may be activated in response to the received mobile phone identification number.

24 Claims, 3 Drawing Sheets

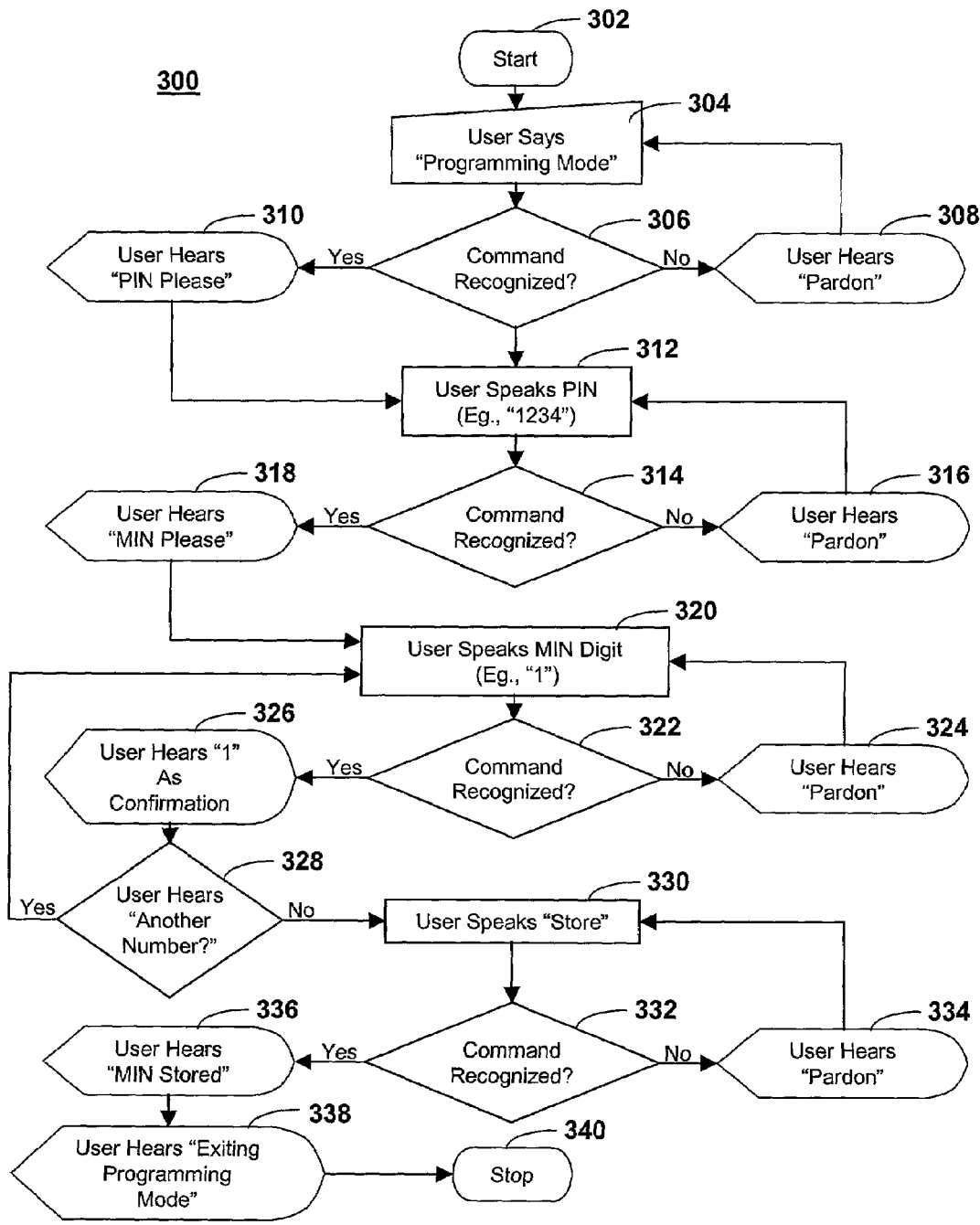

METHOD OF PROGRAMMING A TELEMATICS UNIT USING VOICE RECOGNITION

FIELD OF THE INVENTION

This invention relates generally to programming a communications device using a voice recognition interface. In particular, the invention relates to a method for configuring a telematics unit in a mobile vehicle by using voice recognition.

BACKGROUND OF THE INVENTION

One of the fastest growing areas of communications technology is related to automobile network solutions. An increasing number of mobile vehicles are being equipped with wireless communication devices, requiring personalized or personal identification numbers (PINs) and mobile-phone identification numbers (MINs), i.e. telephone numbers, to be loaded into a telematics unit of the vehicle. The process of loading a telephone number into the unit should be as efficient and uncomplicated as possible with alternative ways of setting up when other methods are unavailable. One currently preferred process utilizes over-the-air service provisioning (OTASP) specified in TIA/EIA/IS-683-A (1998), "Over-the-Air Service Provisioning of Mobile Stations in Spread Spectrum Systems." Another way may be through an air interface function (AIF) with a connection directly to a call center. However, OTASP, AIF, or other processes for activating a telematics unit are not always available or desirable.

It would be beneficial to have another process that would load a telephone number or other operation selections into the telematics unit in the motor vehicle without any additional hardware, communications outside the vehicle, or use of controls such as keypads, phone keys or radio buttons. A "hands-free" process of activating a telematics unit might be desirable and prove easier to implement.

In addition to activating the telematics unit, this process would be able to activate other operations modes within the vehicle, such as activating the mobile phone of the vehicle, initiating a phone call, adjusting vehicle parameters, or adjusting features such as temperature, seat-position or comfort settings.

Therefore, it is the object of this invention to provide a method of configuring and activating an in-vehicle telematics unit, whereby a vehicle user may input a telephone number or other data into the telematics without connections outside the vehicle, such as over-the-air service provisioning or air interface connections to a service call center. The method would require no additional hardware and no use of keys, buttons or other controls inside the vehicle, thereby addressing and overcoming the obstacles and needs described above.

SUMMARY OF THE INVENTION

One aspect of the invention provides a method of programming a telematics unit in a mobile vehicle. A command signal may be received in response to a predetermined voice-recognition command. A cellular programming mode may be activated based on the command signal. A predetermined mobile phone identification number may be received in response to at least one voice-recognition entry. An operations mode may be activated in response to the received mobile phone identification number.

A predetermined personalized identification number may be received in response to at least one voice-recognition entry. The predetermined personalized identification number may be based on a serial number of the telematics unit.

A digitized voice confirmation request message associated with each voice-recognition entry may be sent and a voice-recognition entry confirmation response may be received. A digitized voice confirmation request message associated with the mobile phone identification number may be sent and a voice-recognition entry confirmation response may be received. The mobile phone identification number may be stored in memory.

The operations mode may be selected from a group consisting of a confirmation mode, a call-ready mode, a call origination mode, a system identification table update mode, a preferred roaming list update mode, a unit-ready mode, and a vehicle parameter adjustment mode.

A digitized voice message may be sent based on the operations mode. The digitized voice message may comprise a digitized voice menu presentation. A predetermined function of the operations mode may be activated in response to a voice-recognition entry.

Another aspect of the current invention is a computer usable medium, including a program to program a telematics unit in a mobile vehicle. The program may include computer program code to receive a command signal sent in response to a predetermined voice-recognition command. The program may include code to activate a cellular programming mode based on the command signal. The program may include code to receive a predetermined mobile phone identification number sent in response to at least one voice-recognition entry. The program may include code to activate an operations mode in response to the received mobile phone identification number.

The program may include code to receive a predetermined personalized identification number sent in response to at least one voice-recognition entry.

The program may include code to send a digitized voice confirmation request message associated with each voice-recognition entry, and code to receive a voice-recognition entry confirmation response. The program may include code to send a digitized voice confirmation request message associated with the mobile phone identification number and code to receive a voice-recognition entry confirmation response.

The program may include code to store the mobile phone identification number in memory. The program may include code to send a digitized voice message based on the operations mode. The program may include code to activate a predetermined function of the operations mode in response to a voice-recognition entry.

Another aspect of the current invention is a system for programming a telematics unit in a mobile vehicle. The system may include a means for receiving a command signal sent in response to a predetermined voice-recognition command, a means for activating a cellular programming mode based on the command signal, a means for receiving a predetermined mobile phone identification number sent in response to at least one voice-recognition entry, and a means for activating an operations mode in response to the received mobile phone identification number.

The system may include a means for receiving a predetermined personalized identification number sent in response to at least one voice-recognition entry. The system may also include a means for sending a digitized voice confirmation request message associated with each voice-recognition entry, and a means for receiving a voice-recognition entry confirmation response.

The system may include a means for sending a digitized voice confirmation request message associated with the mobile phone identification number, and a means for receiving a voice-recognition entry confirmation response. The system may include a means for storing the mobile phone identification number in memory.

The system for programming a telematics unit may include a means for sending a digitized voice message based on the operations mode. The system may further include a means for activating a predetermined function of the operations mode in response to a voice-recognition entry.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a flow diagram of another embodiment of a method to program a telematics unit in a mobile vehicle using voice recognition, in accordance with the current invention.

DETAILED DESCRIPTION OF THE PRESENTLY PREFERRED EMBODIMENTS

Figure 1:
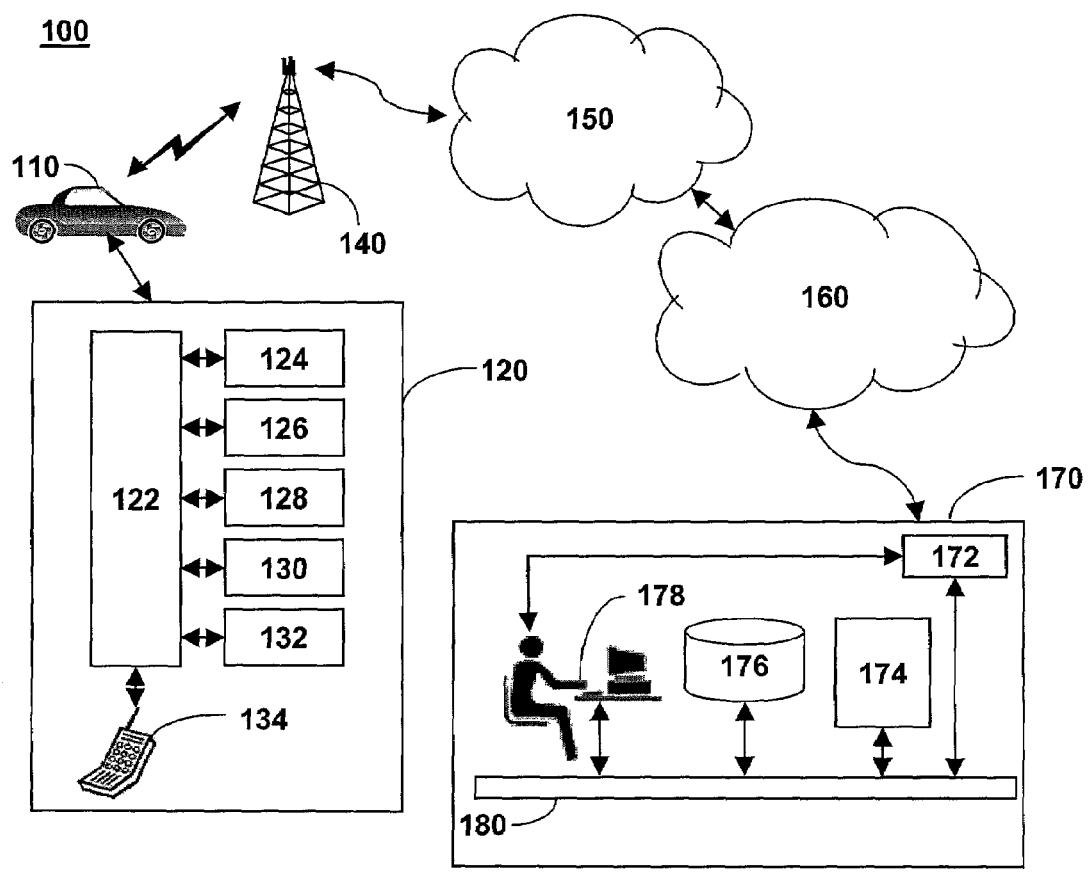
FIG. 1 is a schematic diagram of one embodiment of a system for programming a telematics unit in a mobile vehicle using voice recognition, in accordance with the current invention.

FIG. 1 shows one embodiment of a system for programming a telematics unit in a mobile vehicle using voice recognition, in accordance with the present invention at 100. Fundamental parameters of cellular operations may be provisioned using the voice recognition system.

Telematics unit operational system 100 may include a mobile vehicle 110, a telematics unit 120, one or more wireless carrier systems 140, one or more communication networks 150, one or more land networks 160, and one or more call centers 170.

Mobile vehicle 110 may be a mobile vehicle equipped with suitable hardware and software for transmitting and receiving voice and data communications. Mobile vehicle 110 may contain telematics unit 120 that may be a vehicle communications processor. Telematics unit 120 may include digital signal processor (DSP) 122 connected to wireless modem 124, global positioning system (GPS) unit 126, in-vehicle memory 128, microphone 130, one or more speakers 132, and network access device (NAD) or in-vehicle mobile phone 134. In-vehicle mobile phone 134 may be an analog, digital, or dual-mode cellular phone. GPS unit 126 may provide longitude and latitude coordinates of the vehicle.

DSP 122 may contain various computer programs that control programming and operational modes of various systems within mobile vehicle 110. A voice-recognition application may be installed in DSP 122 and may translate human voice input through microphone 130 to digital signals. These signals may activate the programming mode and operation modes, as well as input data. Output signals from DSP 122 may be translated into digitized voice messages and may be sent out through speaker 132.

Mobile vehicle 110 via telematics unit 120 may send and receive radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Land network 160 may be a public-switched telephone network. Land network 160 may be an Internet protocol (IP) network. Land network 160 may be comprised of a wired network, an optical network, a fiber network, another wireless network, or any combination thereof. Land network 160 may connect communication network 150 to call center 170. Communication network 150 and land network 160 may connect wireless carrier system 140 to a communication node or call center 170.

Call center 170 may contain one or more voice and data switches 172, one or more communication services managers 174, one or more communication services databases 176, one or more communication services advisors 178, and one or more bus systems 180.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Switch 172 may be connected to land network 160. Switch 172 may transmit voice or data transmissions from call center 170. Switch 172 also may receive voice or data transmissions from telematics unit 120 in mobile vehicle 110 through wireless carrier system 140 and communication network 150 and land network 160. Switch 172 may receive from or send to one or more communication services managers 174 data transmissions via one or more bus systems 180. Communication services manager 174 may be any suitable hardware and software capable of providing requested communication services to telematics unit 120 in mobile vehicle 110. Communication services manager 174 may send to or receive from one or more communication services databases 176 data transmissions via bus system 180. Communication services manager 174 may send to or receive from one or more communication services advisors 178 data transmissions via bus system 180. Communication services database 176 may send to or receive from communication services advisor 178 data transmissions via bus system 180. Communication services advisor 178 may receive from or send to switch 172 voice or data transmissions.

Communication services manager 174 may provide one or more of a variety of services, including enrollment services, navigation assistance, directory assistance, roadside assistance, business or residential assistance, information services assistance, emergency assistance, and communications assistance. Communication services manager 174 may transmit data to telematics unit 120 in mobile vehicle 110 through wireless carrier system 140, communication network 150, land network 160, voice and data switch 172, and bus system 180. Communication services manager 174 may store or retrieve data and information from communication services database 176. Communication services manager 174 may provide requested information to communication services advisor 178.

Communication services advisor 178 may be a real advisor or a virtual advisor. A real advisor may be a human being in verbal communication with a user or subscriber in mobile vehicle 110 via telematics unit 115. A virtual advisor may be a synthesized voice interface responding to requests from telematics unit 120 in mobile vehicle 110. Communication services advisor 178 may provide services to telematics unit 120 in mobile vehicle 110. Services provided by communication services advisor 178 may include enrollment services, navigation assistance, directory assistance, roadside assistance, business or residential assistance, information services assistance, emergency assistance, and communications assistance. Communication services advisor 178 may communicate with telematics unit 120 in mobile vehicle 110 through wireless carrier system 140, communication network 150, and land network 160 using voice transmissions, or through communication services manager 174 and switch 172 using data transmissions. Switch 172 may select between voice transmissions and data transmissions.

Telematics unit 120 in mobile vehicle 110 may initiate, for example, a communication services request to call center 170 via wireless carrier system 140, communication network 150, and land network 160. Telematics unit 120 in mobile vehicle 110 may initiate, for example, communications with wireless carrier system 140 in the same geographical region as the mobile vehicle. To establish communications capability between telematics unit 120 and call center 170, telematics unit 120 may require programming and configuration of in-vehicle mobile phone 134.

Figure 2:
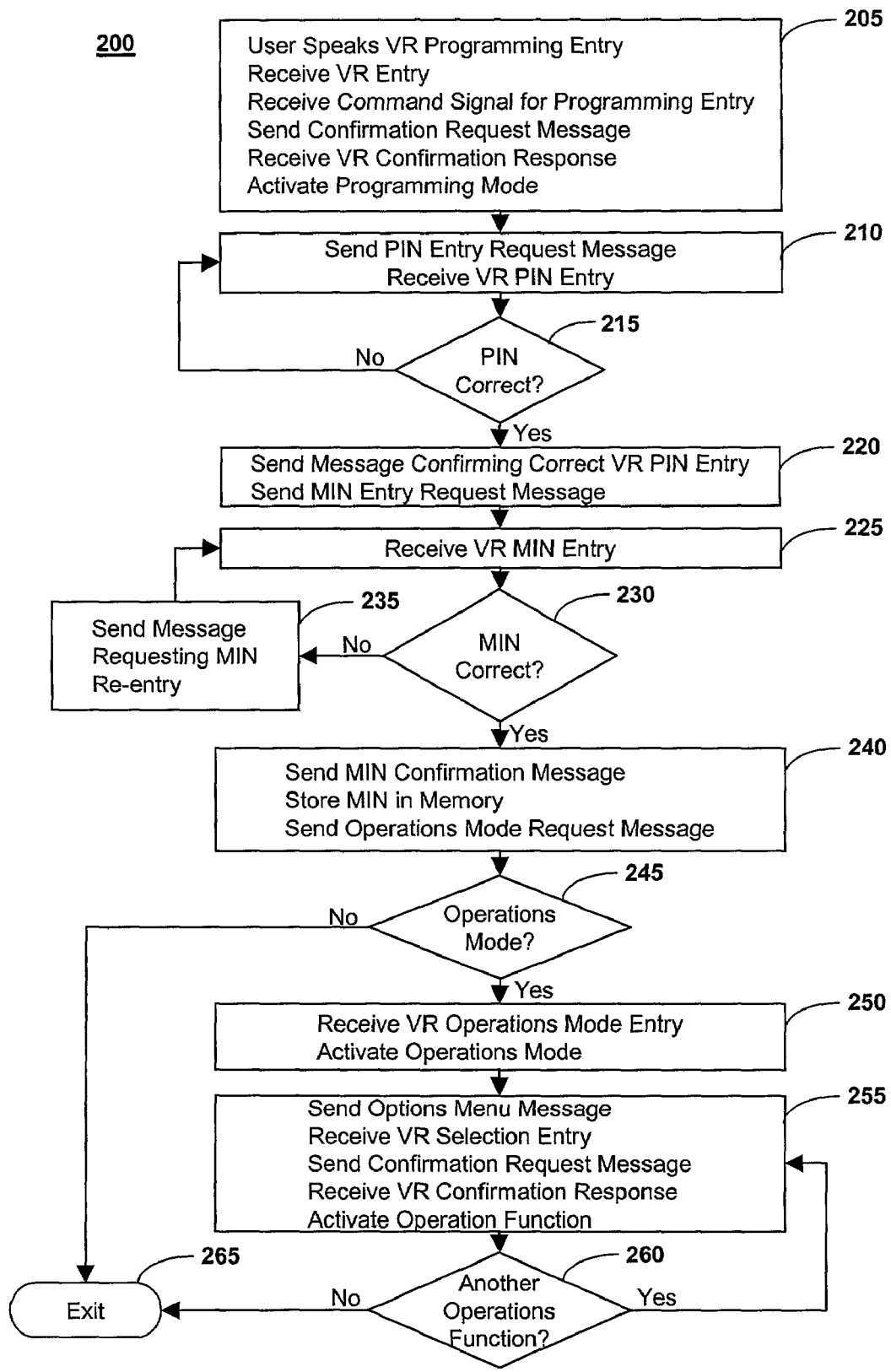
FIG. 2 is a flow diagram of one embodiment of a method to program a telematics unit in a mobile vehicle using voice recognition, in accordance with the current invention.

FIG. 2 shows a flow diagram of one embodiment of a method to program or configure a telematics unit in a mobile vehicle using voice recognition, in accordance with the present invention at 200.

To begin the programming of telematics unit 120, the mobile vehicle user may speak a simple voice command to enter the programming mode, as seen at block 205. Telematics unit 120 may receive the voice-recognition (VR) entry through its microphone 130, which may be converted by the voice-recognition application to a command signal for entering the programming mode. Telematics unit 120 then may send a digitized voice message through speaker 132 to request a confirmation to enter the programming mode, and may receive back a VR response entry confirming that the user wishes telematics unit 120 to enter the programming mode. At this point, telematics unit 120 may activate the programming mode.

Telematics unit 120 may send a digitized voice message requesting the user to enter a personalized or personal identification number (PIN), as seen at block 210, and then may receive back a PIN by a VR entry. The PIN may be supplied to the user by, for example, the telematics service provider. The entered PIN may or may not match the one stored in memory 128, as seen at block 215. The PIN may have been loaded into telematics unit 120 by, for example, the manufacturer of the unit, the automobile manufacturer or the telematics service provider. The PIN may be based on hardware for security. The PIN may be derived from accessing the unit's serial number. The PIN may be derived from a mathematical function operating on the serial number.

When the entered PIN does not match the stored PIN, another digitized voice message requesting a PIN entry may be sent, and another VR PIN entry may be received, as seen back at block 210.

When the entered PIN matches the one stored in memory 128, telematics unit 120 may send a message requesting the user to enter the mobile phone identification number (MIN), i.e. a telephone number, as seen at block 220.

Telematics unit 120 may receive a voice-recognition entry with the MIN from the user, as seen at block 225. The MIN number may be given by the telematics service provider or the wireless carrier provider.

The MIN may or may not be entered correctly, as seen at block 230. A computer application in telematics unit 120 may detect, for example, that the given MIN is incomplete or has incorrect number combinations. Telematics unit 120 may send a digitized voice message that recites the entered digits and may request the user to confirm that the MIN is entered correctly.

When the MIN is not entered correctly, telematics unit 120 may send a digitized voice message requesting that the MIN be re-entered, as seen at block 235, and may receive another VR MIN entry, as seen back at block 225.

When the MIN is entered correctly and has been confirmed by the user, telematics unit 120 may send a digitized voice message acknowledging the confirmation, and then may store the MIN in memory 128, as seen at block 240.

Telematics unit 120 may send a digitized voice message requesting that it enter an operations mode. An operations mode may activate, for example, other operations within the vehicle, such as initiating a phone call, adjusting vehicle parameters, or adjusting features such as temperature, seat-position or comfort settings. The operations mode may include, for example, a confirmation mode, a call-ready mode, a call origination mode, a system identification table (SID) update mode, a preferred roaming list update mode, a unit-ready mode, or a vehicle parameter adjustment mode.

The user may or may not wish for the telematics unit 120 to enter an operations mode, as seen at block 245. Telematics unit 120 may receive a VR entry to exit the programming mode and not enter an operations mode. The programming mode may be exited, as seen at block 265.

When telematics unit 120 receives a VR entry to enter an operations mode, it may activate the operations mode, as seen at block 250. Telematics unit 120 may activate and enter an operations mode, for example, if it is determined that a mobile phone identification number has been entered into memory. Telematics unit 120 may send back a message with a menu listing possible operations and options, as seen at block 255. Alternatively, the user may prompt telematics unit 120 for a menu listing. When telematics unit 120 receives the VR entry of the user's selection from the menu, it may send a message back requesting confirmation on the selection entry. It then may jump to or activate the chosen operation function.

At the completion of an operation, the user may or may not wish to access another operations function, as seen at block 260. Telematics unit 120 may query the user about entering another function and receive an affirmative response, at which time telematics unit 120 may repeat the process of activating a chosen operations function as seen back in block 255.

When telematics unit 120 queries the user about entering another function and receives a response in the negative, the programming or operations modes may be exited, as seen at block 265.

FIG. 3 shows a flow diagram of another embodiment of a method to program a telematics unit in a mobile vehicle using voice recognition, in accordance with the present invention at 300. The process of programming telematics unit 120 using voice-recognition capabilities may begin, as seen at block 302. The programming sequence may be initiated, for example, by turning the telematics unit on.

The mobile vehicle user may say "programming mode" or another similar predetermined voice command as a directive to enter a programming mode, as seen at block 304. The voice command may or may not be recognized by voice-recognition software in telematics unit 120, as seen at block 306. When it is not recognized, the user may hear "Pardon" or another predetermined digitized voice message, as seen at block 308. The user may repeat the programming input command, as seen back at block 304. The programming mode voice command may be made available as part of a voice-recognition help menu, or the programming mode voice command may be hidden from the user to prevent inadvertent use.

An authenticated personalized identification number may be required to enable the programming mode. When the voice-recognition software recognizes the programming input command, the user may hear the digitized message request, "PIN, please," or another predetermined voice command, as seen at block 310. The user may respond by speaking the personal identification number (PIN) such as "1 2 3 4", as seen at block 312.

The voice-recognition software may or may not recognize the PIN voice command, as seen at block 314. When the command is not recognized, the user may hear the digitized voice message, "Pardon", or another predetermined message, as seen at block 316. The PIN entry also may not be recognized when it does not match the one stored in memory. The user may say the PIN again, as seen back at block 312.

When the PIN entry is recognized, the user may hear the next digitized voice message, "Enter the mobile phone number, please" or a similar predetermined message, as seen at block 318. The user may speak a digit of the MIN such as "One", as seen at block 320.

The command with the digit may or may not be recognized, as seen at block 322. When it is not recognized, the user may hear "Pardon" or another similar predetermined message, as seen at block 324.

When the command is recognized, the user may hear the number confirmed in a digitized voice message, as seen at block 326. The user then may hear a message, "Another number?" or another similar predetermined message, as seen at block 328. The user may respond with "Yes" when another digit entry is needed, and may speak another MIN digit, as seen back at block 320.

When the MIN is entered completely and another digit does not need to be entered, the user may say "No" as seen at block 328. At this time, the user may direct telematics unit 120 to store the MIN, as seen at block 330.

The store command may or may not be recognized, as seen at block 332. When it is not recognized, the user may hear the message, "Pardon", as seen at block 334, and again may speak the command, "Store", as seen back at 330. When the store command is recognized, the user may receive confirmation by hearing the message, "MIN stored," or some similar predetermined message, as seen at block 336.

The user may hear another message, "Exiting programming mode" or another similar message, which may indicate the completion of the programming mode, as seen at block 338. The process of programming may end, as seen at block 340. Time-out sequences of telematics unit 120 may be suspended when in the confirmation or programming mode, and may be initiated when the mobile phone provisioning is completed. The user may exit the programming mode by turning the telematics unit off. The telematics unit then may be enabled for service.

What is claimed is:

1. A method of programming a telematics unit in a mobile vehicle, comprising:
   receiving a command signal sent in response to a predetermined voice-recognition command;
   activating a cellular programming mode based on the command signal;
   receiving a predetermined mobile phone identification number sent in response to at least one voice-recognition entry; and
   activating an operations mode in response to the received mobile phone identification number.

2. The method of claim 1 further comprising:
   receiving a predetermined personalized identification number sent in response to at least one voice-recognition entry.

3. The method of claim 2 wherein the predetermined personalized identification number is based on a serial number of the telematics unit.

4. The method of claim 1 further comprising:
   sending a digitized voice confirmation request message associated with each voice-recognition entry; and
   receiving a voice-recognition entry confirmation response.

5. The method of claim 1 further comprising:
   sending a digitized voice confirmation request message associated with the mobile phone identification number; and
   receiving a voice-recognition entry confirmation response.

6. The method of claim 1 further comprising:
   storing the mobile phone identification number in memory.

7. The method of claim 1 wherein the operations mode is selected from a group consisting of a confirmation mode, a call ready mode, a call origination mode, a system identification table update mode, a preferred roaming list update mode, a unit ready mode, and a vehicle parameter adjustment mode.

8. The method of claim 1 further comprising:
   sending a digitized voice message based on the operations mode.

9. The method of claim 8 wherein the digitized voice message comprises a digitized voice menu presentation.

10. The method of claim 1 further comprising:
    activating a predetermined function of the operations mode in response to a voice-recognition entry.

11. A computer usable medium including a program to program a telematics unit in a mobile vehicle comprising:
    computer program code to receive a command signal sent in response to a predetermined voice-recognition command;
    computer program code to activate a cellular programming mode based on the command signal;
    computer program code to receive a predetermined mobile phone identification number sent in response to at least one voice-recognition entry; and computer program code to activate an operations mode in response to the received mobile phone identification number.

12. The computer usable medium of claim 11 further comprising:
computer program code to receive a predetermined personalized identification number sent in response to at least one voice-recognition entry.

13. The computer usable medium of claim 11 further comprising:
computer program code to send a digitized voice confirmation request message associated with each voice-recognition entry; and
computer program code to receive a voice-recognition entry confirmation response.

14. The computer usable medium of claim 11 further comprising:
computer program code to send a digitized voice confirmation request message associated with the mobile phone identification number; and
computer program code to receive a voice-recognition entry confirmation response.

15. The computer usable medium of claim 11 further comprising:
computer program code to store the mobile phone identification number in memory.

16. The computer usable medium of claim 11 further comprising:
computer program code to send a digitized voice message based on the operations mode.

17. The computer usable medium of claim 11 further comprising:
computer program code to activate a predetermined function of the operations mode in response to a voice-recognition entry.

18. A system for programming a telematics unit in a mobile vehicle comprising:
means for receiving a command signal sent in response to a predetermined voice-recognition command;
means for activating a cellular programming mode based on the command signal;
means for receiving a predetermined mobile phone identification number sent in response to at least one voice-recognition entry; and
means for activating an operations mode in response to the received mobile phone identification number.

19. The system of claim 18 further comprising:
means for receiving a predetermined personalized identification number sent in response to at least one voice-recognition entry.

20. The system of claim 18 further comprising:
means for sending a digitized voice confirmation request message associated with each voice-recognition entry; and
means for receiving a voice-recognition entry confirmation response.

21. The system of claim 18 further comprising:
means for sending a digitized voice confirmation request message associated with the mobile phone identification number; and
means for receiving a voice-recognition entry confirmation response.

22. The system of claim 18 further comprising:
means for storing the mobile phone identification number in memory.

23. The system of claim 18 further comprising:
means for sending a digitized voice message based on the operations mode.

24. The system of claim 18 further comprising:
means for activating a predetermined function of the operations mode in response to a voice-recognition entry.

* * * * *